United States Patent
Nashed

(10) Patent No.: US 8,688,513 B2
(45) Date of Patent: Apr. 1, 2014

(54) METHOD AND SYSTEM FOR PROVIDING ACCESS RIGHTS TO A COMMUNICATIONS NETWORK SITE

(76) Inventor: Ashraf Nashed, Whitehouse Station, NJ (US)

(*) Notice: Subject to any disclaimer, the term of this patent is extended or adjusted under 35 U.S.C. 154(b) by 1885 days.

(21) Appl. No.: 11/332,132

(22) Filed: Jan. 13, 2006

(65) Prior Publication Data

US 2006/0161479 A1 Jul. 20, 2006

Related U.S. Application Data

(63) Continuation-in-part of application No. 11/131,809, filed on May 18, 2005.

(60) Provisional application No. 60/630,692, filed on Nov. 24, 2004, provisional application No. 60/651,195, filed on Feb. 9, 2005.

(51) Int. Cl.
    *G06Q 30/00* (2012.01)
(52) U.S. Cl.
    USPC ........................................... 705/14.1
(58) Field of Classification Search
    USPC .................................... 705/14, 14.1
    See application file for complete search history.

(56) References Cited

U.S. PATENT DOCUMENTS

| | | | |
|---|---|---|---|
| 5,864,871 A | 1/1999 | Kitain et al. | 707/104 |
| 6,061,660 A * | 5/2000 | Eggleston et al. | 705/14 |
| 6,251,017 B1 | 6/2001 | Leason et al. | 463/42 |
| 6,473,740 B2 | 10/2002 | Cockrill et al. | 705/27 |
| 6,496,855 B1 | 12/2002 | Hunt et al. | 709/217 |
| 6,606,605 B1 | 8/2003 | Kolls | 705/26 |
| 6,671,358 B1 | 12/2003 | Seidman et al. | 379/93.12 |
| 6,701,303 B1 | 3/2004 | Dunn et al. | 705/75 |
| 6,745,187 B2 | 6/2004 | Singer et al. | 707/9 |
| 2001/0021915 A1 | 9/2001 | Cohen et al. | 705/14 |
| 2001/0034635 A1 | 10/2001 | Winters | 705/10 |
| 2002/0169875 A1 * | 11/2002 | Furui et al. | 709/225 |
| 2004/0073483 A1 | 4/2004 | Cohen et al. | 705/14 |
| 2004/0186774 A1 | 9/2004 | Lee | 705/14 |
| 2004/0215512 A1 | 10/2004 | Farat | |
| 2004/0224771 A1 * | 11/2004 | Chen et al. | 463/42 |
| 2004/0267731 A1 | 12/2004 | Gino Monier et al. | |

* cited by examiner

*Primary Examiner* — Daniel Lastra

(74) *Attorney, Agent, or Firm* — Lerner, David, Littenberg, Krumholz & Mentlik, LLP

(57) ABSTRACT

A user of a communications network is provided with limited access rights to one or more restricted access communications network sites that are partnered with a base entity, which can have an associated base communications network site, if the user utilizes communications network access capabilities associated with the base entity to access the partner sites.

19 Claims, 6 Drawing Sheets

METHOD AND SYSTEM FOR PROVIDING ACCESS RIGHTS TO A COMMUNICATIONS NETWORK SITE

RELATED APPLICATIONS

This application is a continuation-in-part of U.S. application Ser. No. 11/131,809, filed May 18, 2005, and claims the benefit of U.S. application Ser. No. 11/131,809, U.S. Provisional Application Ser. No. 60/630,962, filed Nov. 24, 2004 and U.S. Provisional Application Ser. No. 60/651,195, filed Feb. 9, 2005, each of which is incorporated by reference herein.

FIELD OF THE INVENTION

The present invention relates generally to use of resources available on a communications network and, more particularly, to providing a user of a communications network with limited access rights to a communications network site, which is partnered with a base entity and to which access is ordinarily restricted, if the user uses a communications network site access capability associated with the base entity to access the partner site.

BACKGROUND OF THE INVENTION

Communications networks include communications network sites that facilitate a user's efforts to access and obtain information from other communications network sites that are coupled to or exist on the networks. The communications network currently used by most individuals is the Internet. The Internet includes many websites that seek to disseminate information, content, products or services. The websites often includes a search engine that assists users to locate desired information, products, services, content, etc.

The owners of websites obtain revenue, in part, from advertisers that advertise on the websites. The advertisers pay the websites to display their advertisement based on the number of hits the websites receive. The websites, therefore, desire to attract individuals to access their respective websites and, for example, use an application such as a search engine, advertisement bar, tool bar or other content included on or provided by their websites, rather than to visit another website that may contain the same or a competing application.

There exists a need for creating an incentive for a user to access a particular a communications network site, rather than other communications network sites, on the communications network so that the site can increase the revenues it receives from advertisers.

SUMMARY OF THE INVENTION

In accordance with a first aspect of the present invention, a base communications network site, such as a website on the Internet including applications such as a search engine, browser toolbar or advertisement bar and having a commercial relationship with a base entity, partners with other communications network sites, such as a content provider website, and automatically awards credits to a user registered with the base site when the registered user interacts with the base site. The registered user can redeem the credits awarded at the partner sites to, for example, obtain access to premium or subscription-only web pages available at the partner websites. The automatic award of redeemable credits to registered users who interact with the base website, thus, creates an incentive for users of the communications network to use the base website rather than another website to, for example, search the Internet for information, content, products and services. In a preferred embodiment, the base website automatically awards credits to a user that registers with the base website each time that the registered user interacts with the base website, such as by accessing or using an application found on the base website. By registering with the base website, the user can obtain access to and, for example, retrieve content available only on the premium web pages of a partner website without becoming a paid subscriber of the partner website.

In an alternative embodiment, the user can redeem credits to purchase products or services offered at a partner website, or to retrieve data, such as audio, video or text content, available at the partner website.

In another aspect of the present invention, a base entity, which may be an individual or business enterprise owning a base communications network site, provides a user with limited access rights to partner communications network sites to which access is ordinarily restricted, if the user utilizes communications network site access capabilities, which are associated with the base entity, to access the partner sites. The communications network site access capabilities associated with the base entity can include a communications network site access application residing on a network communications terminal, or downloadable to a network communication terminal from, for example, the base site, any of the partner sites or other communication network sites that are not associated with the base entity. The site access application is, preferably, a search engine, a browser toolbar or an advertisement bar. By use of the site access application to access the partner site, the user is provided with limited access rights to the at least one partner site. A network access identifier code, which is generated at a network communications terminal used by the user, preferably upon the user's initial use of the site access application, facilitates the user's having limited access rights to at least one of the partner sites based on the user's utilizing the communications network site access capabilities associated with the base entity to access the partner sites.

In a preferred embodiment, a network site to which access is ordinarily restricted is a network site requiring a user to pay a subscription fee to obtain access. In a further preferred embodiment, the identifier code is generated at a user's terminal when a user initially uses a communications network site access application available for download on the base sit and that the user downloaded to the user terminal. In a further preferred embodiment, the user pays a fee before the identifier code is generated on its terminal, and the identifier code is preferably generated during download of an access application.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which.

DETAILED DESCRIPTION OF THE INVENTION

The method and system of the present invention create incentives for a user of a communications network to interact with or use a communications application associated with a specific, base entity. The base entity is associated with, for example, has a commercial relationship with or owns, a base communications network site.

In a first preferred embodiment of the invention, following registration of a user with a base site, the user is awarded credits based on interaction with the base site, such as accessing or performing applications on the base site, and the user can redeem the credits at one or more partner communications network sites that have entered into commercial arrangements with the base site. The credits can be redeemed, for example, to obtain access to premium pages of the partner sites, for monetary credits that can be used in connection with the purchase of products or services available on the partner sites and for the ability to download premium or subscription-only content available on the partner websites.

Figure 1:
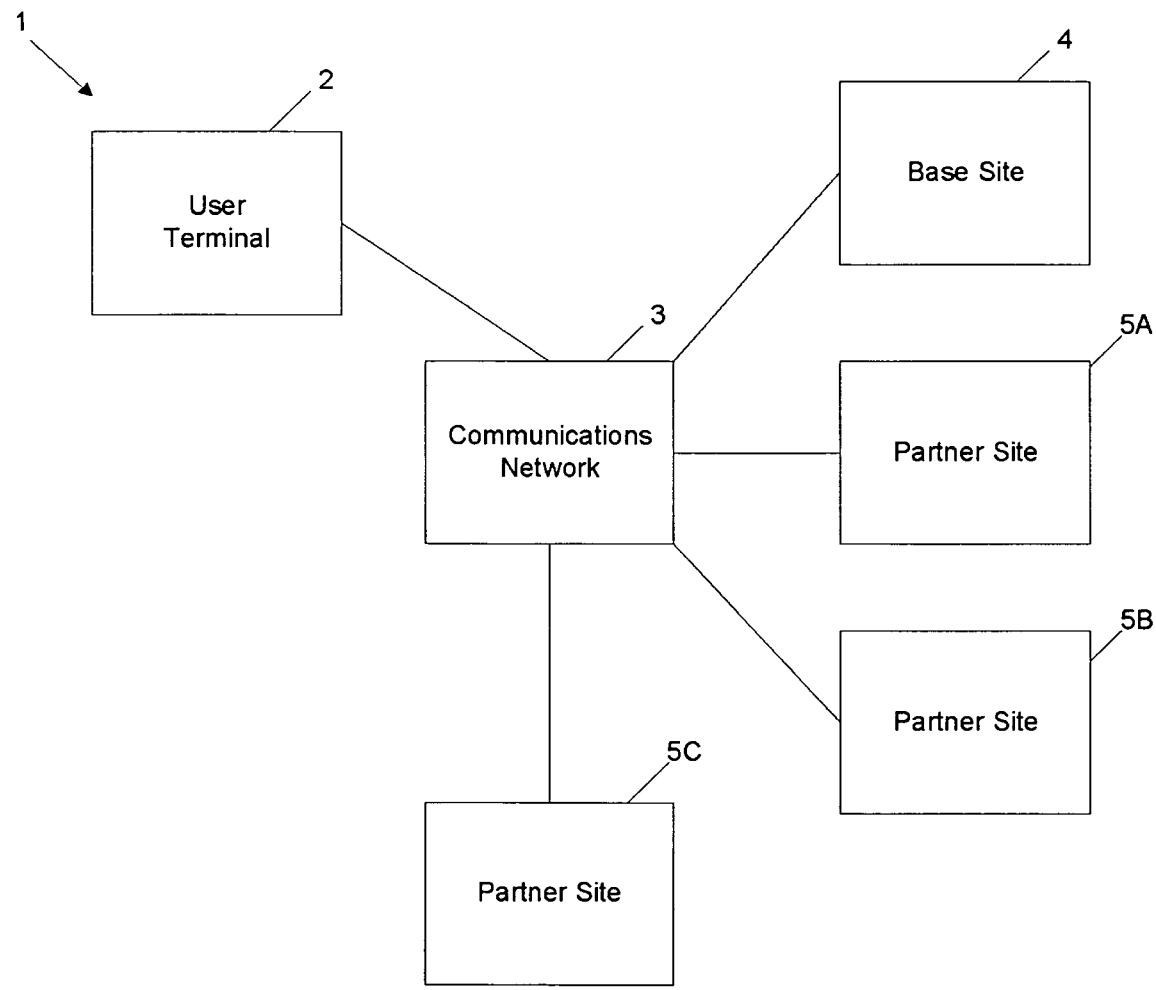
FIG. 1 is a block diagram of a communications network system for rewarding use of a communications network site in accordance with the present invention.

FIG. 1 shows in block diagram form a preferred embodiment of a communications network system 1 for rewarding use of a communications network site in accordance with the present invention. Referring to FIG. 1, the system 1 includes a user terminal 2 coupled to a communications network 3. In addition, each of a base communications network site 4 and a plurality of partner communications network sites 5 are coupled to the communications network 3.

It is to be understood that each of the communications network sites in the system 1 which is described below as performing data processing operations is a software module or, alternatively, a hardware module or a combined hardware/software module. In addition, each of the data processing modules in the system 1 suitably contains a memory storage area, such as RAM, for storage of data and instructions for performing processing operations in accordance with the present invention. Alternatively, instructions for performing processing operations can be stored in hardware in one or more of the databases in the system 1.

User terminal 2 is a conventional computer or handheld device, such as a stand alone personal or laptop computer including a monitor, mouse and keyboard, having communications capability and that a user can operate to establish a communications link with a remote communications device over a communications network, such as the Internet. The network 3 is any conventional communications network, such as the Internet or any wired or wireless electronic network or an optical fiber network, that serves as a medium for establishing a communications link between two communication devices.

The communications network sites 4 and 5 are preferably websites having communications capabilities, and include servers and associated processors that perform data processing operations and provide for the exchange of information over the network 3, such as communicating information with web browsers operating on a user terminal over the communication network 3, as well known in the art. The sites 4 and 5 can include such applications as a search engine, content links and advertisement bars, and also have transaction capabilities that permit a user accessing the site via the browser on the user terminal to purchase products and services and also to download content, as well known and conventional in the art.

Figure 2:
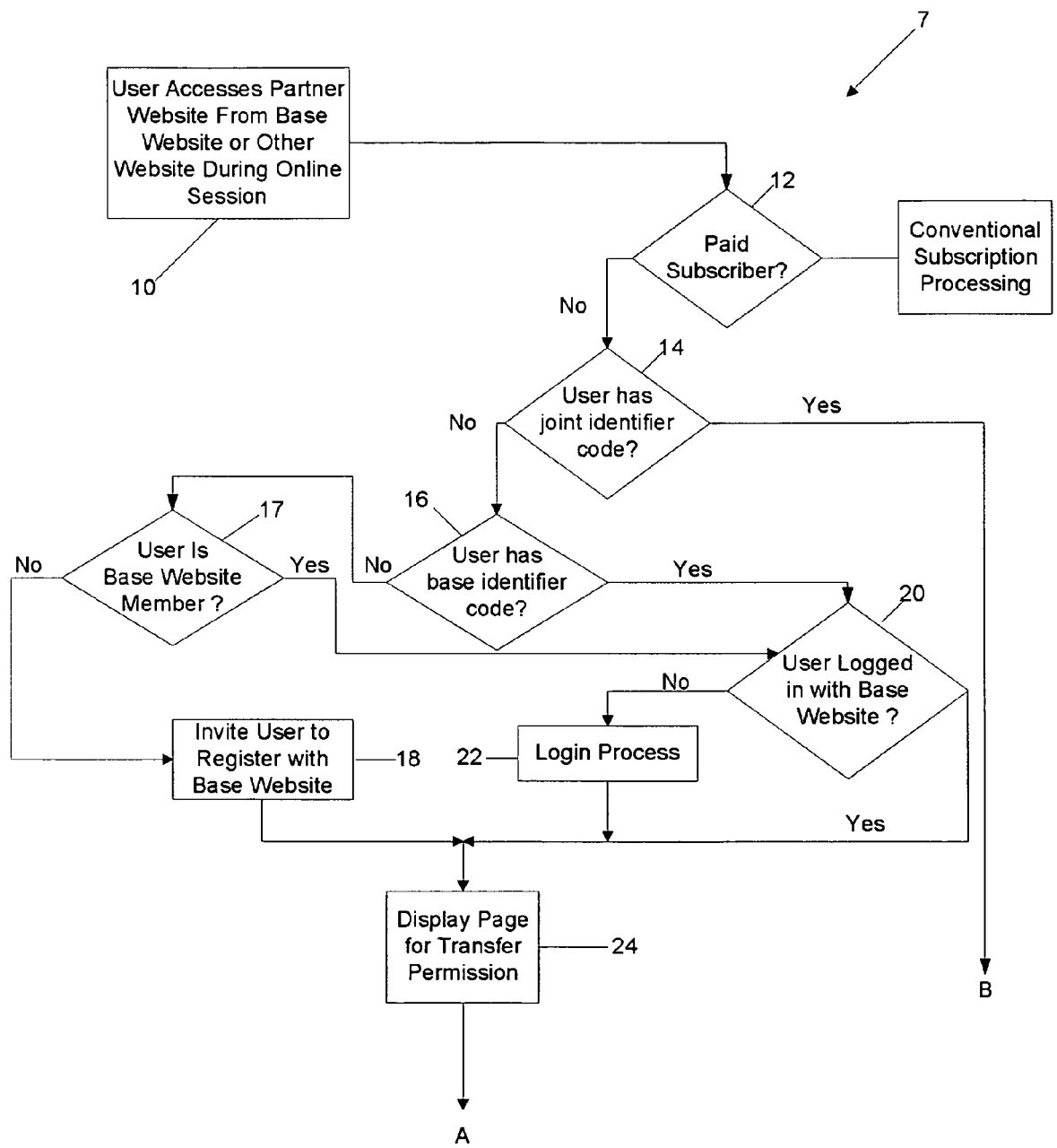
FIG. 2 is a high level flow diagram of a process for rewarding registered users of a base website with credits that can be redeemed at a partner website in accordance with the present invention.
Figure 2:
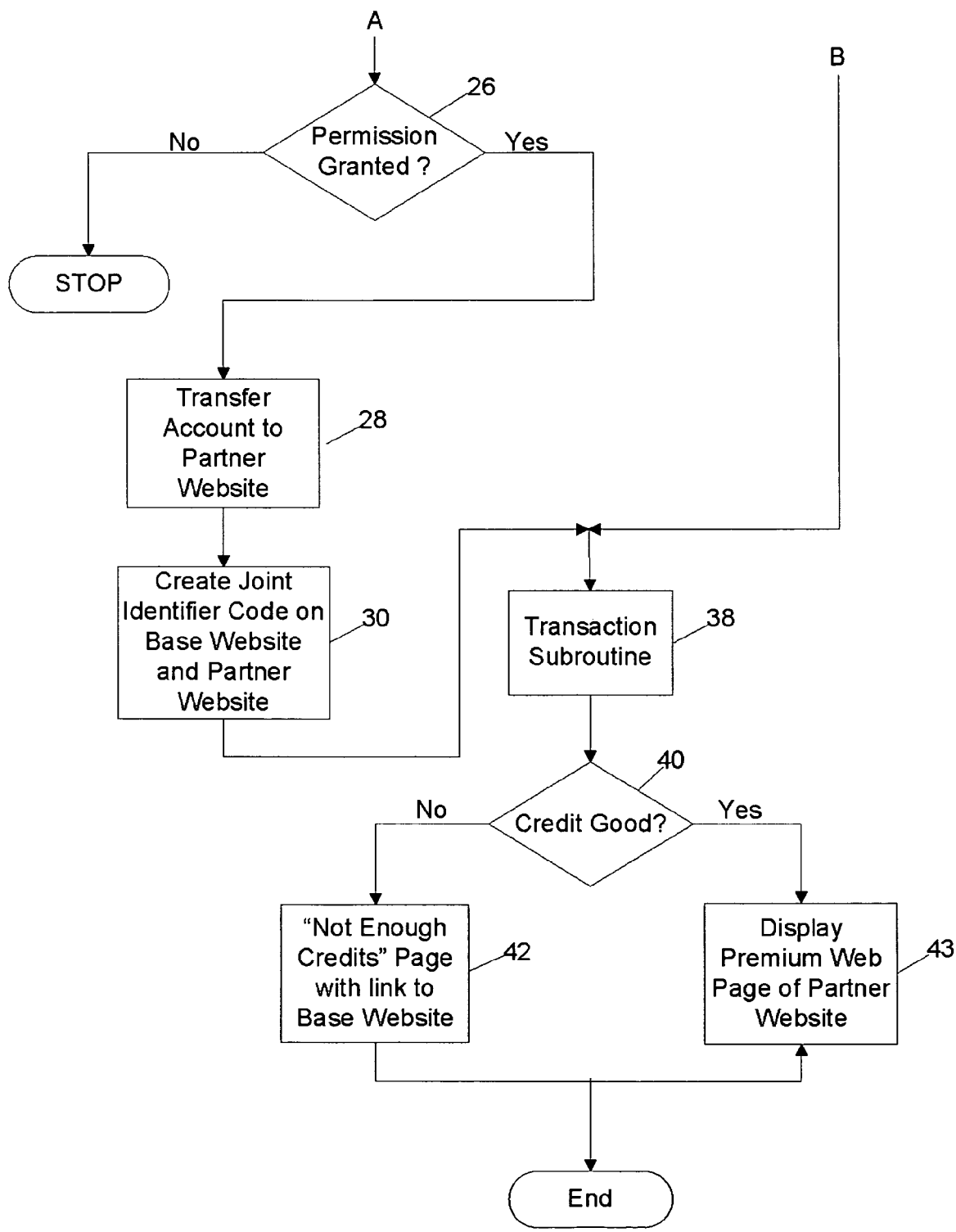

FIG. 2 shows a preferred process 7 for awarding registered users of a base website with credits that can be redeemed to obtain access to premium content or to retrieve data or purchase products or services available at a partner website in accordance with the present invention. For purposes of illustration, the process 7 is described in connection with operations performed on the system 1 as shown in FIG. 1 where the communications network sites are websites and the network 3 is the Internet. Referring to FIG. 2, in step 10 an Internet user, during an online session at the user terminal 2, accesses a desired commercial premium content website 5A, such as the website of the NEW YORK TIMES, that is a website partner of the base website 4 and includes premium web pages available for access only by paid subscribers. The premium web pages include, for example, specialized premium content and, optionally products or services that can be purchased or data that can be retrieved only by a paid subscriber. The user can access the partner website 5A from the base website 4 with which the partner website is associated, or any other website. In an alternative preferred embodiment, the base website and the partner website have a common ownership interest.

In step 12, the partner website 5A determines if the user is a paid subscriber of the partner website. If yes, the user, as a paid subscriber, is permitted to access the premium web pages of the partner website in accordance with a conventional subscription service, which is not a part of the present invention.

Figure 3:
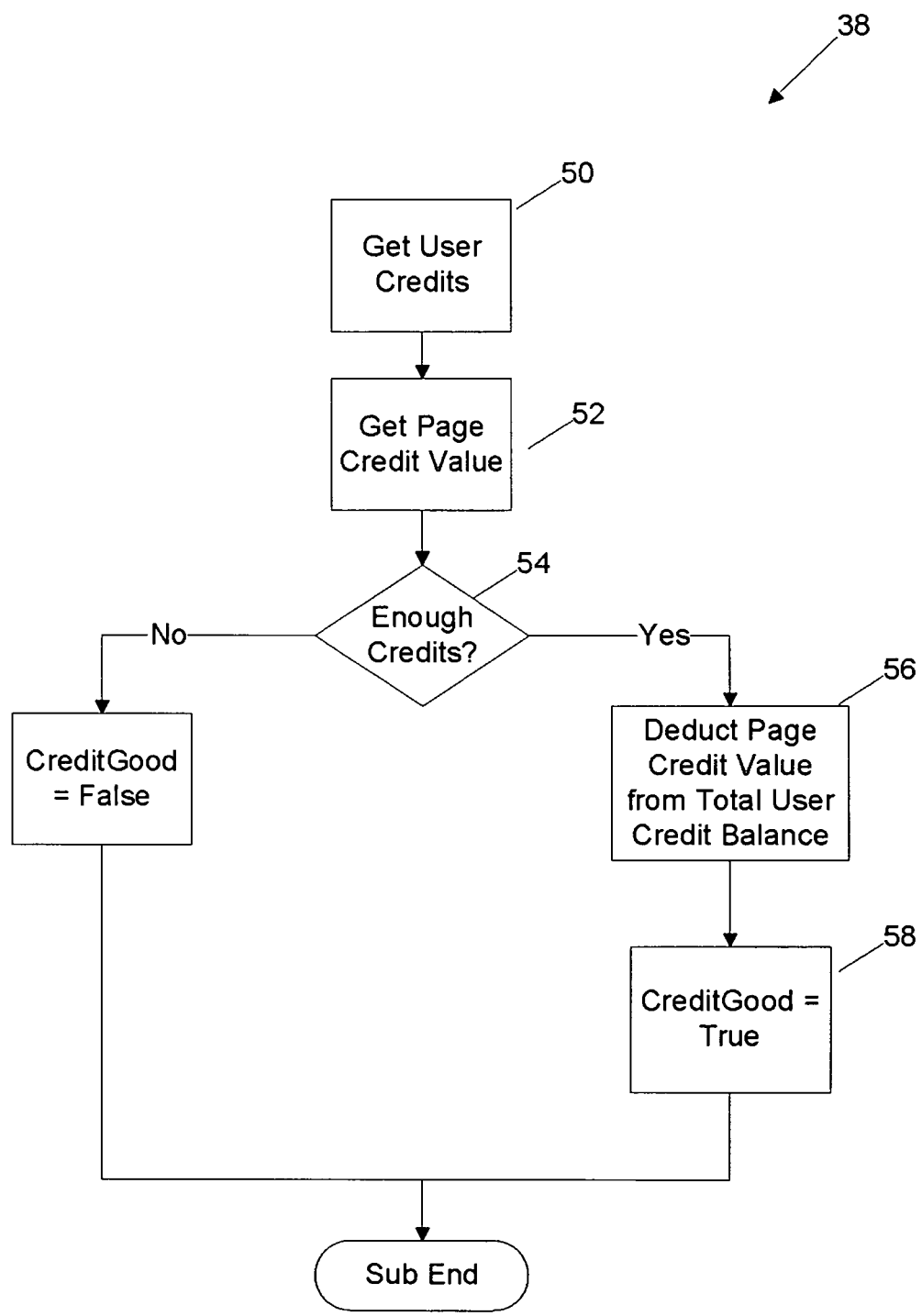
FIG. 3 is a high level flow diagram of a process for determining if a registered user has sufficient credits to access premium web pages of a partner website in accordance with the present invention.

If the determination is no in step 12, then in step 14 the partner website 5A determines if the user has been assigned a joint identifier code. The joint identifier code is, for example, one or more cookies placed on the terminal 2 that the user is using to connect to Internet websites, and identifies the user as registered with the base website 4 and also registered with the partner website 5A. If the determination is yes, a transaction subroutine process, as shown in FIG. 3 and which determines if the registered user has sufficient credits available to access the premium web pages of the partner website 5A or to purchase products and services or to retrieve data available at the partner website 5A, is performed in step 38.

If the determination is no in step 14, then in step 16 the partner website 5A determines if the user terminal 2 has a base identifier code, which can be in the form of a cookie or identification and password, indicating that the user is registered with the base website 4. If the determination is no in step 16, the partner website 5A requests the user in step 17 to respond whether he previously registered with the base website 4. For example, the user may be using a different user terminal than the one the user used to register with the base website 4, such that the terminal the user is using in the online session does not have a base identifier code thereon. Alternatively, the user may have registered with the base website 4 but the base identifier code previously placed on the user's terminal during registration may have been deleted. If the user responds no in step 17, the user is presented with a registration subroutine in step 18 that invites the user to register with the base website 4.

Figure 4:
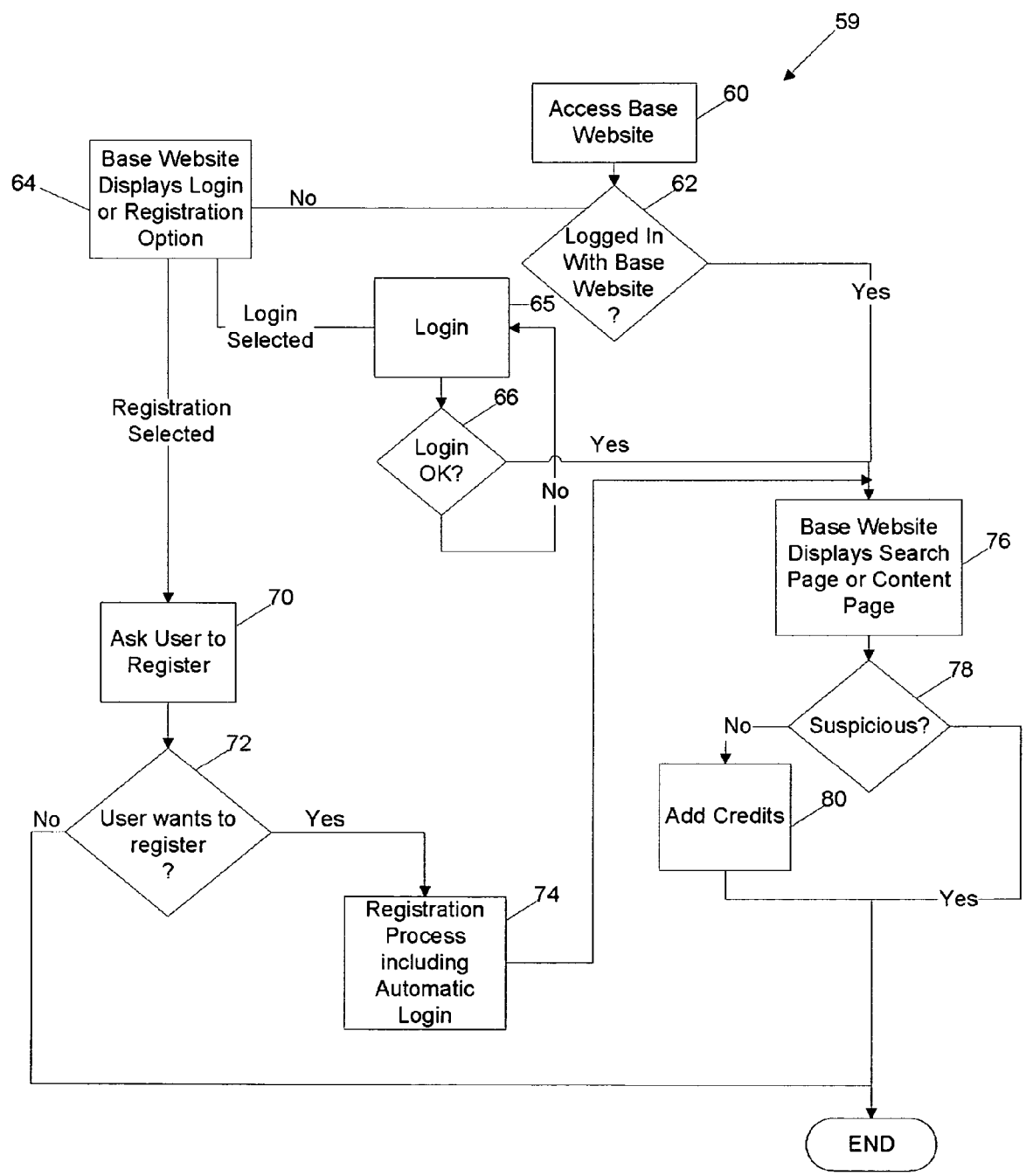
FIG. 4 is a high level flow diagram of a process for registering a user at a base website and awarding the registered user with credits in accordance with the present invention.

FIG. 4 shows a preferred process 59 for initially registering a user with the base website 4, which includes creating a base identifier code on the user terminal 2, and awarding a registered user with credits based on the user's interaction with the base website 4 in accordance with the present invention. By registering with the base website 4 and then subsequently accessing the base website 4 and also using applications available on the base website 4, such as performing searches using a search engine contained on the base website 4, the registered user acquires credits that can be redeemed to access premium content web pages of the partner websites 5, and to retrieve data and to purchase products or services made available on preferably premium, or alternatively non-premium, webpages of the partner websites 5. In a preferred embodiment, an initial number of free credits may be awarded on initial registration of the user with the base website 4.

Credits are automatically awarded to the registered user, preferably, each time that the registered user interacts with the base website 4, such as by accessing or using an application available on the base website 4. An advertiser maintaining an advertisement bar on the base website 4, for example, communicates with the base website 4 following the user's accessing the advertiser's website from the base website and the base website 4, in turn, automatically awards credits to the registered user.

Referring to FIG. 4, in step 60 the user terminal 2 links to the base website 4 after the user becomes communicatively connected to the Internet. Then in step 62 the base website 4 determines if the user previously logged in with the base website 4, such as during an earlier online session following connection to the Internet. If no, in step 64 the base website 4 displays a login page on the user terminal 2 that asks the user whether he is already registered with the base website 4 and would like to login, or whether he is not registered and would like to have additional information for potentially becoming registered with the base website 4.

If the user in step 64 indicates that he would like to login, in step 65 the base website 4 displays a login box at the user terminal 2 in which the user can enter login information, such as a password, and also displays options to the user at the terminal 2 to assist the user with login, such as sending the user an email with his password in the event the user forgot his login information. Then in step 66, the base website 4 determines if the password entered by the user is valid. If the password is not valid because, for example, the user entered the incorrect password, the base website 4 informs the user that login was not achieved and the base website 4 returns to step 65 so that the user can take steps to obtain the correct login and complete the login process.

If the user in step 64 indicates that he would like to register with the base website 4, in step 70 the base website 4 displays on the user terminal 2 a request that the user respond whether the user desires to register with the base website 4. The display provides information as to the advantages and rewards the user can obtain by registering with and using the base website 4 to, for example, perform searches. For example, the information may state that the user accumulates credits upon initial registration with the base website 4 and each time that the user accesses the base website 4 or uses an application on the base website 4, such as performing a search on a search engine or clicking on an advertisement bar on the base website 4, and that the registered user can redeem the credits in exchange for access to premium content on the partner websites 5, or for credits that can be applied to the purchase of products and services or to the retrieval of data available on the partner websites 5.

In step 72, the base website 4 determines if the user's response is affirmative concerning registration. If yes, in step 74 the base website 4 performs a registration process that collects relevant information from the user, such as contact information, demographic information and credit card information, creates a base identifier code on the user terminal 2 identifying the user as registered with the base website 4 and automatically logs the user in with the base website 4. In a preferred embodiment, step 18 of the process 7 includes steps 70, 72 and 74 of the process 59.

Following step 74, or if the determination in steps 62 or 66 is yes, in step 76 the base website 4 displays a search or content page on the user terminal 2. In step 78, the base website 4 determines if the request that a search be performed or content be retrieved is suspicious based on business rules that attempt to ensure that credits are not awarded based on attempts to illegitimately use the base website 4. For example, an illegitimate use is if the request at the base website 5 is received from a terminal of a registered user that repeatedly links to the base website 4, using an automated process, to accumulate credits without the registered user's controlling the actions of the terminal. If the search request is authenticated as being controlled by the registered user and not an automated process being performed on a registered user's terminal that contains a base identifier code, the base website 4 in step 80 adds credits to the user's account. The registered user, as explained below, can then redeem the credits to, for example, obtain access to premium content on a partner website 5.

In a preferred embodiment, the user automatically earns credits for each search request performed or page viewed on the base website. In another preferred embodiment, the registered user can purchase credits on the base website.

In a further preferred embodiment, the base website has entered into a credit conversion agreement with other businesses that provide a user with redeemable credits based on transactions performed with such businesses, and the conversion agreement provides that credits accrued with the other businesses can be converted into credits with the base website, and vice versa.

Referring again to the process 7 shown in FIG. 2, if the user responds yes in step 17, then in step 20 the partner website 5A determines if the user initially logged in with the base website 4 prior to reaching the partner website 5A. If the determination is no in step 20, the partner website 5A at step 22 provides that the user can login with the base website 4 either on the partner website 5A, or alternatively on the base website 4. In a preferred embodiment, the base website 4 or any partner website 5 can attend to login of a registered user and store account data, such as earned credits, for the registered user.

Once the user is logged in with the base website 4, in step 24 the partner website 5A displays a webpage on the user terminal 2 requesting the user's permission to transfer information from the user's account with the base website 4 to the partner website 5A. In step 26, the partner website 5A determines if permission was granted. If yes, in step 28 the base website 4 transfers information from the user's account at the base website 4 to the partner website 5A. Then in step 30 each of the partner website 5A and the base website 4 creates on its server a joint identifier code corresponding, or which can provide for access, to the user's account information and places the joint identifier code on the user terminal 2.

Following step 30 or if the determination in step 14 is yes, the partner website 5A performs transaction subroutine step 38, as shown in detail in FIG. 3, to determine whether the user can redeem credits earned based on use of the base website 4 to, for example, access premium web pages of the partner website 5A. Referring to FIG. 3, the subroutine step 38 includes step 50 where the partner website 5A retrieves from the base website 4 the current number of earned credits that the user has in his account ("user credit balance"). Then in step 52 the partner website 5A retrieves from its memory the page credit value corresponding to its premium website pages. In step 54, the partner website 5A determines if the user has sufficient credits to access the premium web pages, in other words, if the user credit balance exceeds the page credit value. If yes, in step 56 the partner website 5A deducts the page credit value from the user credit balance and provides that the user's account information at the base website 4 is suitably updated. In step 58, the partner website 5A sets a creditgood flag as true, which indicates that the user has sufficient earned credits available to access premium web pages on the partner website 5A.

If the determination in step 54 is no, the partner website 5A sets a creditgood flag as false, which indicates that the user has not earned sufficient credits required to access premium web pages on the partner website 5A.

In a preferred embodiment, different combinations of steps of the process 38 can be performed either on a partner website 5 or the base website 4.

In an alternative preferred embodiment, the partner website performs the transaction subroutine 38 to determine if the user has sufficient credits to retrieve content or to purchase products and services available on the partner website.

Referring again to FIG. 2, in step 40 the partner website 5A, based on the setting of the creditgood flag, determines whether the user has sufficient earned credits. If yes, in step 43 the partner website 5A displays premium web pages of the partner website 5A containing, for example, premium content, that the user can access and download. The user's account information corresponding to the user's base identifier code, which for example includes the user's home address, email address and other like information, provides that electronic content selected for access can be readily delivered electronically to the user terminal 2 without the user's having to provide such electronic address information when selecting the content on the premium partner website 5A for retrieval. If the user does not have sufficient credits, in step 42 the partner website 5A displays a statement that the user does not have sufficient earned credits to access the premium web pages and provides a link to the base website 4 with the indication that additional credits can be earned by visiting the base website 4. For example, the link, if clicked on by the user, provides that the step 76 of the process 59 is performed.

In an alternative preferred embodiment, the partner website has entered a business arrangement with a base website wherein the partner website generates a temporary permission identifier code on the user terminal if the determination in step 40 is yes. The temporary identifier code provides the partner website with a mechanism to allow the user to have, in step 43, unlimited rights to access content on the partner website for a predetermined time interval, such that the partner website does not have to monitor use of its website by the user. As a result, the partner website does not need to repeatedly perform the transaction subroutine of step 38 each time that the user desires to access premium webpages or premium content on the partner website.

In a further preferred embodiment, the base website generates a universal temporary permission identifier code on the user terminal before step 38 is performed, or after a user performs a search on the base website. The universal temporary identifier provides the user with time limited, unlimited access rights to content on one or more partner websites, regardless if the user has any user credits. In this embodiment, a user can access content on a partner website for free, for a limited period of time, which permits the content partner website to promote its content library to the user. In alternative embodiment, the universal temporary identifier provides the user with time limited and limited access, such as providing a user with access to one webpage per week.

In an alternative preferred embodiment, the user terminal includes a monitoring application, such as a toolbar application, that the base website or partner website downloads to the user terminal after initial registration and prior to the creation of a joint identifier code. The monitoring application operates in the background on the user terminal to monitor a user's activities in connection with a base website and a partner website, such as the user's performing a search on the base website or accessing premium content on a partner website. The monitoring application automatically, or based on upon receipt of a request from the base website, transmits to the base website reports detailing the user's activities in connection with the base website and partner websites.

In a further alternative embodiment, the monitoring application is installed on a user terminal during manufacture of the terminal. The installed monitoring application is programmed to monitor user activities relating to one or more base websites and also their respective partner websites. In addition, a base website can remotely update the monitoring application to add or delete partner websites to be monitored.

In another preferred embodiment of the present invention, referring again to FIG. 1, a base entity with which the base site 4 is associated is partnered with the partner sites 5A-5B, which are communications network sites to which access is ordinarily restricted. For example, the partner site 5 is a premium content website that ordinarily can be accessed only by those who paid a subscription fee to the website. In accordance with the present invention, the user must utilize communications network site access capabilities associated with the base entity to obtain access rights, which have predetermined limitations, to one or more of the partner sites 5.

In a preferred embodiment, the base website 4, any of the base entity's partner websites 5 or other communication network sites unaffiliated with the base entity includes a downloadable communications network site access application associated with the base entity. Alternatively, a communications network site access application associated with the base entity resides on a communications network terminal that the user uses to access network sites over a communications network. When the user uses the access application to access a website, the application, automatically and without requiring any action or input of data on the part of the user, provides the user with limited access rights to at least one of the partner sites 5, and also the ability to access all other communications network sites that do not have access restrictions. The access application, for example, is a tool bar that includes a search engine, an advertisement bar or a browser bar.

In a preferred embodiment, when a user initially uses a network site access application associated with a base entity at a user terminal, an access rights identifier code is generated at the user terminal 2 that the user uses to connect to Internet websites, for example, in the form of one or more cookies. When a communications network connection is subsequently established between the terminal 2 and a communications network, the site access application automatically transmits the identifier code to a base website associated with the base entity, if such site exists, and a partner site 5 to which the access rights defined by the identifier code apply. The access rights identifier code identifies the user as using the access application associated with the base entity, such as a site access application downloaded to the user terminal 2 from the base website 4, to access the partner site 5. The access rights identifier code includes encoding data representative of the limited access rights to a partner site provided to a user when the user uses the access application to access the partner site.

The same access rights identifier code can be assigned to multiple users, or alternatively distinct access rights identifier codes can be assigned to distinct users, depending on the characteristics of the limited access rights to partner sites to be provided.

The limitations on the access rights to one or a group of partner sites can be changed over time, and also can depend upon optional preference selections displayed to and selected by the user prior to, or during, download or initial use of the access application. The limitations on the access rights can include the following: number of permissible accesses to one or a selected group of the partner sites; what content is accessible at one or a selected group of the partner sites; the quantity of content accessible, i.e., how many webpages can be displayed or downloaded, from one or a selected group of the partner sites; and a time limitation restriction applied to one or more of the foregoing. In a preferred embodiment, for example, the access rights encoded into the identifier code provide that the user, when using the downloaded access application to access partner sites, can access one webpage of a selected group of the partner sites an unlimited number times during a two month period.

In a preferred embodiment, when the user initially uses the access application, a monitoring application, as is well known in the art, and which is preferably a part of the access application, or which alternatively resides on the base website 4, a partner website 5 or website not associated with the base entity, also receives the access rights identifier code generated, and assigned to a user, at the user's terminal 2. The monitoring application automatically tracks and stores in a rights access database, from which a partner website, the base website 4 or other website associated with the base entity can retrieve data, information representative of the following access activities which are connected with a distinct access rights identifier code: the number of times a user of the terminal accesses a partner communications network site; the length of time a user stays on a partner site once the user accesses the partner site; how many pages of a partner site the user displays on the terminal when accessing the partner site; and what particular content on a partner site, which is identified by a content-specific identifier, does the user access, and how much of this specific content does the user access, and how many times does the user access this content, over a predetermined time interval. In a preferred embodiment, the monitoring application is not utilized to track user activities where the limited access rights provide for unlimited access for a predetermined time interval.

In a further preferred embodiment, the monitoring application is downloaded to the user terminal 2 with the access application and makes access activity data available for retrieval by the base site 4, the partner sites 5 or other sites associated with the base entity.

Figure 5:
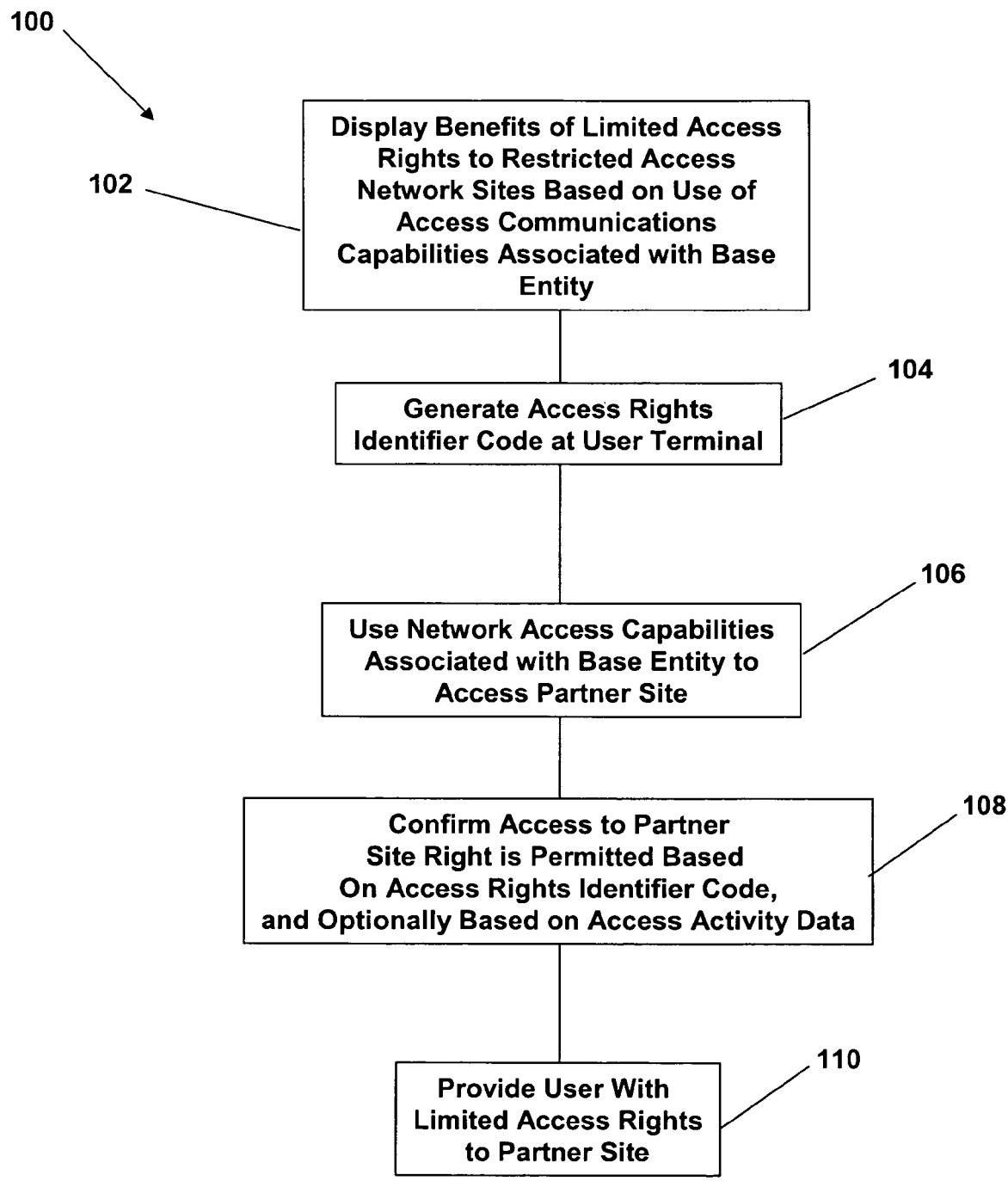
FIG. 5 is a high level flow diagram of a process for providing a user with limited access rights to a communications network site partnered with a base entity in accordance with the present invention.

FIG. 5 shows a preferred process 100 for providing limited access rights to partner sites 5 by use of the communications network site access capabilities of a base communications network site 4. For purposes of illustration, the process 100 is described in connection with operations performed on the system 1 as shown in FIG. 1 where the communications network sites are websites and the network 3 is the Internet. Referring to FIG. 5, in step 102 a display is generated on the user terminal 2 of an Internet user when the user visits the base website 4 or any of the partner websites 5. The display explains to the user that the user would be provided limited access rights to selected, restricted access communication network sites, which are partnered with the base entity that in the exemplary embodiment owns the base website 4, if the user utilizes communications network site access capabilities associated with the base entity to access the restricted access partner sites. The display further includes a download icon that, if clicked on by the user, results in download of a communication network site access application onto the user terminal 2. As described below in connection with steps 106 and 108, following installation of the access application on the user terminal 2, the user can use the access application to obtain limited access rights to one or a selected group of websites to which access is ordinarily restricted, such as a subscription-only website that includes premium content pages. The limitations on the access rights, for example, include a predetermined time interval within which access rights are available to the selected group of the partner sites, and the amount and type of content available for access at the partner site(s).

In step 104, when the user initially uses an access application, for example, which the user downloaded from the base site 4, one of the partner sites 5 or other sites not associated with the base entity, or alternatively resides on the terminal 2, an access rights identifier code is created on the user terminal 2. The application furthermore provides that the identifier code is automatically sent to the base website 4, if such exists, and the one or more of the partner websites 5 to which the access rights identifier code provides limited access rights when a connection to the communications network 3 is established from the terminal 2: In addition, the identifier code is stored at a destination site upon receipt.

In step 106, the user of the terminal 2 at which the access rights identifier code was generated uses the access application, which can be a toolbar including a browser and search engine, to access a partner website 5.

Then in step 108, the partner website 5 being accessed determines whether the access rights identifier code stored at the user terminal 2 is also stored at the partner website 5. If yes, the partner website 5 retrieves information from a rights access database, which preferably is maintained at a centralized data storage facility, such as the base website 4, to determine whether the interaction the user of the terminal 2 wants to perform with the partner website, such as the download of a document, is permissible based on the limited access rights provided by the rights identifier code, and furthermore, optionally based on any access activity information retrieved from the access database. Based on the access rights limitations set forth in the identifier code and activity data retrieved from the access database, the partner website 5 in step 108 determines what type of access, if any, is permitted.

Following confirmation in step 108 that the user can access the partner site in view of the limited access rights provided to the user based on the identifier code, in step 110 the user obtains limited access to one or more portions, such as webpages, of the partner website 5.

In a preferred embodiment, the access rights identifier code includes a temporary identifier code, which provides the user with an unlimited right to access content on a partner website for a predetermined time interval, such that the activities of the user in connection with the partner website do not have to be monitored during the specified time interval.

In a further preferred embodiment, the access rights identifier code includes a universal access temporary identifier code, which provides the user with time limited, unlimited access rights to content on one or more partner websites. In this embodiment, a user can access content on a partner website for free, for a limited period of time. In an alternative embodiment, the universal access temporary identifier code provides the user with time limited and limited access, such as providing a user with access to only one webpage of a partner website per day and where the user can access the website only for a two month period.

In another preferred embodiment, the user must pay a fee to proceed with download of the access application to obtain limited access rights to one or more of the partner sites. Following payment of the fee and installation of the access application on the user's terminal, the user, without further data entry, can obtain limited access rights to one or more of the partner sites by use of the access application.

In a further preferred embodiment, a fee that must be paid to obtain access rights is automatically deducted from an account established by the user at the base website when the user previously registered with the base site, such as described in U.S. Pat. No. 6,654,749, incorporated by reference herein.

Although preferred embodiments of the present invention have been described and illustrated, it will be apparent to those skilled in the art that various modifications may be made without departing from the principles of the invention.

What is claimed is:

1. A method for providing an access right to a restricted access communications network site, comprising:
   providing at least one restricted access communications network site partnered with a base entity, wherein the at least one partner site includes a first processor and wherein the at least one partner site is communicatively coupled to a communications network; and
   providing, by the at least one partner site or a communications network site associated with the base entity communicatively coupled to the communications network and including a second processor, a user with an access right to the at least one partner site, based on use by the user at a communication terminal of a communications network site access capability associated with the base entity;
   generating, by the at least one partner site or the base entity associated site, a network access identifier code for the user, wherein the access identifier code includes access right information for the at least one partner site, and wherein the access right information is determined by the at least one partner site or the base entity associated site without input from the user and includes at least one predetermined limitation on access by the user to content from the at least one partner site; and
   determining, by the at least one partner site or the base entity associated site, whether a predetermined interaction by the user with the at least one partner site is permissible, based on the at least one predetermined limitation on access by the user to content from the at least one partner site and activity data indicating at least one of an amount of use of the communications network site access capability associated with the base entity by the user or an amount of interaction with the at least one partner site by the user.

2. The method of claim 1, wherein the communications network site access capability associated with the base entity includes a communications network site access application, wherein the application is at least one of downloadable from a communications network site and residing on the communication terminal used by the user.

3. The method of claim 2, wherein the application is downloadable from at least one of the base entity associated site and the at least one partner site.

4. The method of claim 1 further comprising:
   monitoring use of the communications network site access capability associated with the base entity by the user or interaction with the at least one partner site by the user to collect the activity data.

5. The method of claim 1, wherein the predetermined limitation includes at least one of a time limitation on when the content from the at least one partner site is accessible by the user, a numerical limit on accesses by the user of the content from the at least one partner site, a restriction as to which of the content is accessible by the user from the at least one partner site and a limit on quantity of the content accessible by the user from the at least one partner site.

6. The method of claim 1, wherein the user pays a fee to have the identifier code generated at the terminal.

7. The method of claim 1, wherein the base entity associated site provides for the communications network site access capability.

8. The method of claim 1, wherein the predetermined limitation on access by the user to the content includes a limitation on download to, or display of a webpage on, the terminal used by the user of selected content from the at least one partner site.

9. A system for providing an access right to a restricted access communications network site, comprising:
   at least one restricted access communications network site partnered with a base entity, wherein the at least one partner site includes a first processor and is communicatively coupled to a communications network, and
   wherein the at least one partner site or a communications network site associated with the base entity including a second processor and communicatively coupled to the communications network is for providing an access right to a user based on use by the user at a communication terminal of a communications network site access capability associated with the base entity; and wherein the at least one partner site or the base entity associated site is for generating a network access identifier code for the user, wherein the access identifier code includes access right information for the at least one partner site, and wherein the access right information is determined by the at least one partner site or the base entity associated site without input from the user and includes at least one predetermined limitation on access by the user to content from the at least one partner site, and
   wherein the at least one partner site or the base entity associated site determines whether a predetermined interaction by the user with the at least one partner site is permissible, based on the at least one predetermined limitation on access by the user to content from the at least one partner site and activity data indicating at least one of amount of use of the communications network site access capability associated with the base entity by the user or an amount of interaction with the at least one partner site by the user.

10. The system of claim 9, wherein the communications network site access capability includes a communications network site access application, wherein the application is at least one of downloadable from a communications network site and residing on the communications terminal used by the user.

11. The system of claim 10, wherein the application is downloadable from at least one of the base entity associated site and the at least one partner site.

12. The system of claim 9, wherein the predetermined limitation includes at least one of a time limitation on when the content from the at least one partner site is accessible by the user, a numerical limit on accesses by the user of the content from the at least partner site, a restriction as to which of the content is accessible by the user from the at least one partner site and a limit on quantity of the content accessible by the user from the at least one partner site.

13. The system of claim 9 further comprising:
a communications network site access activity monitor for monitoring use of the communications network site access capability associated with the base entity by the user or interaction with the at least one partner site by the user to collect the activity data.

14. The system of claim 9, wherein the user pays a fee to have the identifier code generated at the terminal.

15. The system of claim 9, wherein the base entity associated site is for providing the communications network site access capability.

16. The system of claim 9, wherein the predetermined limitation on access by the user to the content includes a limitation on download to, or display of a webpage on, the terminal used by the user of selected content from the at least one partner site.

17. A system for providing an access right to a restricted access communications network site, comprising:
at least one restricted access communications network site partnered with a base entity, wherein the at least one partner site includes a first processor and is communicatively coupled to a communications network;
wherein the at least one partner site or a communications network site associated with the base entity including a second processor and communicatively coupled to the communications network is for awarding credit to a user, based on at least one of an amount of use of a communications network site access capability associated with the base entity by the user at a communication terminal or an amount of interaction with the at least one partner site by the user;
wherein the at least one partner site or the base entity associated site is for generating a network access identifier code for the user, wherein the access identifier code includes access right information for the at least one partner site, and wherein the access right information is determined by the at least one partner site or the base entity associated site without input from the user and includes at least one predetermined limitation on access by the user to content from the at least one partner site; and wherein the at least one partner site or the base entity associated site determines whether a purchase transaction by the user with the at least one partner site is permissible, based on the network access identifier code for the user and by redeeming the credit awarded to the user.

18. A system comprising:

a communications network site associated with a base entity including a first processor and communicatively coupled to a communications network, wherein the base entity associated network site is for monitoring activity of a user to obtain activity information indicating at least one of (i) an amount of use of a communications network site access capability associated with the base entity by the user at a communication terminal or (ii) an amount of interaction by the user with the base entity associated network site or a communication network site partnered with the base entity including a second processor and communicatively coupled to the communications network, wherein the base entity associated site determines whether a predetermined interaction by the user with the base entity associated network site is permissible, based on the activity information.

19. The system of claim 18, wherein the predetermined interaction is a purchase transaction determined to be permissible by redeeming credit of the user indicated in the activity information.

* * * * *